United States Patent [19]

Nakamura et al.

[11] Patent Number: 4,844,977
[45] Date of Patent: Jul. 4, 1989

[54] MAGNETIC RECORDING MEDIUM

[75] Inventors: Issei Nakamura, Hachioji; Kazumasa Matsumoto, Tokyo, both of Japan

[73] Assignee: Konishiroku Photo Industry Co., Ltd., Tokyo, Japan

[21] Appl. No.: 28,023

[22] Filed: Mar. 17, 1987

Related U.S. Application Data

[63] Continuation of Ser. No. 607,343, May 4, 1984, abandoned.

[30] Foreign Application Priority Data

May 10, 1983 [JP] Japan ................. 58-81072

[51] Int. Cl.$^4$ ............................................. G11B 5/74
[52] U.S. Cl. .................................. 428/328; 427/128;
428/329; 428/425.9; 428/694; 428/900
[58] Field of Search ............ 428/694, 407, 403, 423.7,
428/900, 458, 329, 328, 425.9, 521, 522, 523,
695; 427/131, 128; 252/62.54; 360/134–136

[56] References Cited

U.S. PATENT DOCUMENTS

| 3,574,685 | 4/1971 | Haines et al. | 427/128 |
| 3,821,025 | 6/1974 | Akashi | 428/694 |
| 4,020,236 | 4/1977 | Aonuma et al. | 428/900 |
| 4,064,292 | 12/1977 | Schoenafinger et al. | 427/127 |
| 4,125,474 | 11/1978 | Dezawa et al. | 428/900 |
| 4,137,361 | 1/1979 | Deffeyes | 428/694 |
| 4,167,582 | 9/1979 | Takahashi et al. | 428/328 |
| 4,188,302 | 2/1980 | Becker et al. | 427/127 |
| 4,262,037 | 4/1981 | Adasa et al. | 427/132 |
| 4,287,233 | 9/1981 | Rudolf et al. | 428/900 |
| 4,296,149 | 10/1981 | Rudolf et al. | 427/130 |
| 4,321,302 | 3/1982 | Umeki et al. | 428/404 |
| 4,379,809 | 4/1983 | Matsufuji et al. | 428/694 |
| 4,390,361 | 6/1983 | Sueyoshi et al. | 428/403 |
| 4,396,668 | 8/1983 | Saito et al. | 428/694 |
| 4,407,901 | 10/1983 | Miyatsuka | 428/407 |
| 4,414,245 | 11/1983 | Miyazawa et al. | 427/127 |
| 4,457,955 | 7/1984 | Okamura et al. | 427/132 |
| 4,539,261 | 9/1985 | Nakata et al. | 428/403 |

FOREIGN PATENT DOCUMENTS

| 75497 | 7/1978 | Japan. | |
| 15407 | 2/1979 | Japan. | |
| 139508 | 10/1979 | Japan | 428/328 |
| 24486 | 2/1980 | Japan. | |
| 31138 | 3/1980 | Japan. | |
| 23201 | 3/1981 | Japan. | |
| 25908 | 3/1981 | Japan. | |
| 32305 | 2/1982 | Japan. | |
| 32306 | 2/1982 | Japan. | |
| 32307 | 2/1982 | Japan. | |
| 50138 | 3/1984 | Japan | 523/181 |

Primary Examiner—Paul J. Thibodeau
Attorney, Agent, or Firm—Jordan B. Bierman

[57] ABSTRACT

A magnetic recording medium is disclosed which comprises a support having formed thereon a magnetic layer containing a magnetic metallic powder with no change in its differential thermal curve up to a temperature of at least 80° C. Said magnetic metallic powder contains an alloy system of at least one metal selected from the group consisting of iron, nickel and cobalt as the main component(s) with or without at least one other element, such as Fe-Ni-Co, Fe-Mn-Zn, Fe-Co-Ni-P, Fe-Ni-Zn, Fe-Ni-Cr-P, Fe-Co-Ni-Cr, Fe-Co-P, Fe-Ni, Fe-Ni-Mn, Co-Ni, Co-Ni-P, Fe-Al, Fe-Mn-Zn or Fe-Al-P.

29 Claims, 4 Drawing Sheets

Temperature at which a change was observed in the differential thermal curve (°C)

MAGNETIC RECORDING MEDIUM

This application is a continuation of application Ser. No. 607,343, filed May 4, 1984, now abandoned.

BACKGROUND OF THE INVENTION

1. Field of the Invention

The present invention relates to a magnetic recording medium, and more particularly, to a magnetic recording medium having high resistance to oxidation, great durability to repeated still-frame operation, and high storage stability.

2. Description of the Prior Art

Magnetic medium generally consists of a support shaped in a tape or sheet form from poly (ethylene terephthalate) having a magnetic layer applied from a coating paint containing magnetic powder and a binder as two major components. Metallic powder incorporated in the magnetic layer as magnetic powder are superior to iron oxide powder with respect to squareness ratio, saturation magnetization and coercivity. However, metallic powder smaller than 1 μm are not only difficult to disperse but also are easily oxidized and corroded to cause a gradual decrease in the saturation magnetization, storage stability and durability to repeated still-frame operation. Also, metallic powder are highly reactive and are pyrophoric at room temperature. The instability of metallic powder against oxidation is partly due to the inherent properties of the metal, but the principal cause is said to be pinholes present in the surface of the metallic powder.

As a result of various studies made to develop a method of increasing the stability of metallic powder against oxidation, the present inventors have found that the surface state of metallic powder has a very close relation with the stability of the differential thermal curve of the powder. FIG. 1 is an electron photomicrograph (30,000X) of a known type of magnetic metallic magnetic powder whose differential thermal curve varies at between 20° and 70° C. Obviously, the powder comprises relatively smooth-surfaced acicular particles overlapping each other. On the other hand, as shown in the electron photomicrograph of FIG. 2, a magnetic metallic powder whose differential thermal curve does not change up to a temperature of at least 80° C. comprises acicular particles which are characterized by high surface asperity and a smaller number of pinholes that are generally understood to make magnetic metallic powder less stable against oxidation. This finding which states to the effect that fewer pinholes contribute to an improved heat stability of the differential thermal curve of a particular magnetic metallic powder, and hence an improvement in its stability against oxidation, has led to the accomplishment of the present invention.

SUMMARY OF THE INVENTION

The primary object of the present invention is to provide a magnetic recording medium having high resistance to oxidation, great durability to repeated still-frame operation, and high storage stability.

The above stated object of the present invention can be achieved by forming on a support a magnetic layer containing a magnetic metallic powder having no change in its differential thermal curve up to a temperature of at least 80° C.

BRIEF DESCRIPTION OF THE ACCOMPANYING DRAWING

DETAILED DESCRIPTION OF THE INVENTION

Magnetic metallic powders that can be incorporated in magnetic layer of the magnetic recording medium are iron powder or alloy system of iron with other metallic components such as Fe-Ni-Co, Fe-Mn-Zn, Fe-Co-Ni-P, Fe-Ni-Zn, Fe-Ni-Cr-P, Fe-Co-Ni-Cr, Fe-Co-P, Fe-Ni or Fe-Ni-Mn.

Figure 1:
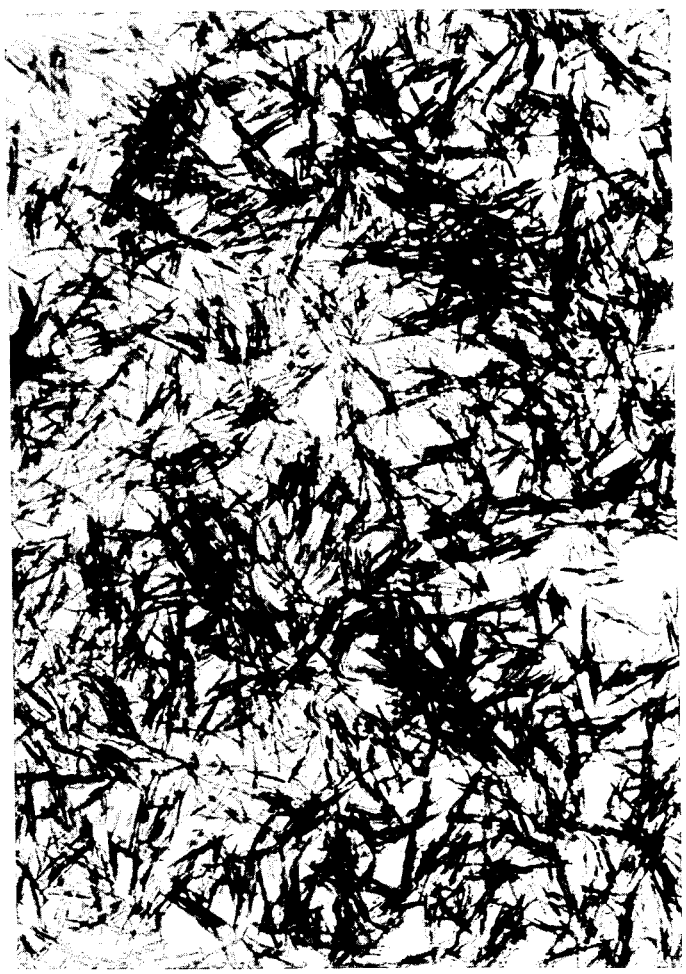
FIG. 1 is an electron photomicrograph (30,000X) of conventional metallic magnetic powder.
Figure 2:
FIG. 2 is an electron photomicrograph of the magnetic metallic powder to be incorporated in the magnetic layer of the recording medium of the present invention which have a differential thermal curve having no change up to a temperature of at least 80° C.
Figure 3:
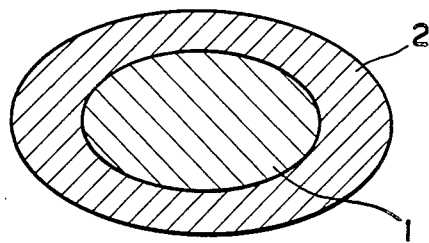
FIG. 3 is a schematic diagram of a magnetic metallic powder having a polymer coat.

The above magnetic metallic powders can be kept substantially unchanged in their differential thermal curve up to a temperature of at least 80° C. by the following three methods:

(1) The outer surface of a magnetic metallic powder 1 is provided with a coat 2 of a thermally stable polymer, say, polymide resin (see FIG. 3).

Figure 4:
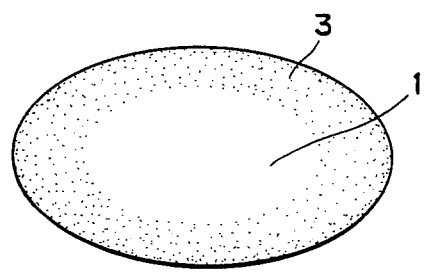
FIG. 4 is a schematic diagram of a magnetic metallic powder the outer surface of which was gradually oxidized.

(2) The outer surface of a metallic powder 1 is gradually oxidized to form a stable layer of oxide 2 (see FIG. 4).

(3) A particular metallic powder is lattice- or surface doped with aluminum.

It is preferred that the greater part of the magnetic powder in the magnetic layer of the recording medium of the present invention be prepared by the third method, with either the first or second method or both being used as auxiliary techniques. The magnetic metallic powder prepared by the first method has a relatively small proportion of the metallic magnetic powder per unit volume, and magnetization per unit volume of the resulting magnetic layer is smaller than in the case of a magnetic layer using uncoated metallic magnetic powders.

The same problems occur in the magnetic metallic powder prepared by the second method: the volume of the unoxidized part of a magnetic metallic powder which contributes to magnetization becomes smaller.

Therefore, it is preferred that the magnetic metallic powder to be incorporated in the magnetic layer of the recording medium of the present invention be primarily produced by the third method described above and be characterized by the thermal stability of the magnetic metallic powder per se. If necessary, this last method may be combined with either the first or second method or both.

If the dopant is aluminum and/or its compound, it is used in such an amount that the aluminum atoms account for 0.5 to 20%, preferably 1 to 20%, of the atomic weight of all metallic components of the magnetic metallic powder. If the proportion of the aluminum atoms is less than 0.5% of the atomic weight of the metallic components, the resulting magnetic powder does not have a satisfactory stability against heat or oxidation, and is unable to provide a magnetic recording medium having good performance, i.e. high storage stability, high output on playback, and great durability against repeated still-frame operation.

A binder is incorporated in the magnetic layer of the magnetic recording medium of the present invention, and any known thermoplastic resins, thermosetting or reactive resins, resins that cure upon irradiation with electron beams, as well as mixtures of these resins may be used as the binder.

Suitable thermoplastic resins have a softening point of less than 150° C., an average molecular weight of about 10,000 to 200,000, and a degree of polymerization of about 200 to 2,000. Examples of such polymers are vinyl chloride/vinyl acetate copolymer, vinyl chloride/vinylidene chloride copolymer, vinyl chloride/acryl onitrile copolymer, acrylic acid ester/acrylonitrile copolymer, acrylic acid ester/vinylidene chloride copolymer, methacrylic acid ester/ethylene copolymer, urethane elastomer, polyvinyl fluoride, vinylidene chloride/acrylonitrile copolymer, butadiene/acrylonitrile copolymer, polyamide resin, polyvinyl butyral, cellulose derivative (e.g. cellulose acetate butyrate, cellulose diacetate, cellulose triacetate, cellulose propionate, or nitrocellulose), styrene/butadiene copolymer, polyester resin, chlorovinyl-ether/acrylic acid ester copolymer, amino resins, various synthetic rubber thermoplastic resins and mixtures thereof.

Specific examples of these resins are given in Japanese Patent Publications Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/73, as well as U.S. Pat. Nos. 3,144,352, 3,419,420, 3,499,789 and 3,713,887.

The thermosetting or reactive resin is such that it has a molecular weight of 10,000 to 200,000 when it is in coating solution and that after application and drying of a coating solution, its molecular weight is increased infinitely due to condensation, addition or other reactions. Preferred thermosetting or reactive resins are those which do not soften or melt until they are decomposed with heat. Specific examples are phenolic resins, epoxy resins, polyurethane curable resin, urea resin, melamine resin, alkyd resin, silicone resin, acrylic reactive resin, a mixture of high-molecular weight polyester resin and isocyanate prepolymer, a mixture, of methacrylic acid salt copolymer and diisocyanate prepolymer, a mixture of polyester polyol and polyisocyanate, urea-formaldehyde resin, low-molecular weight glycol/high-molecular weight diol/triphenylmethane triisocyanate mixture, polyamine resins and mixtures thereof.

Specific examples of these resins are found in Japanese Patent Publications Nos. 8103/64, 9779/65, 7192/66, 8016/66, 14275/66, 18179/67, 12081/68, 28023/69, 14501/70, 24902/70, 13103/71, 22067/72, 22072/72, 22073/72, 28045/72, 28048/72 and 28922/72, as well as U.S. Pat. Nos. 3,144,353, 3,320,090, 3,437,510, 3,597,273, 3,781,210 and 3,781,211.

Illustrative resins that cure upon irradiation with electron beams include unsaturated prepolymers such as maleic anhydride type, urethane acrylic type, epoxy acrylic type, polyester acrylic type, polyether acrylic type, polyurethane acrylic type and polyamide acrylic type, as well as polyfunctional monomers such as ether acrylic type, urethane acrylic type, epoxy acrylic type, phosphate ester type, aryl type and hydrocarbon type.

The above listed binders may be used either alone or in combination with themselves or other additives.

The binder is used in an amount of 5 to 400 parts by weight, preferably 10 to 200 parts by weight, per 100 parts by weight of the magnetic metallic powder of the present invention. If the binder is used in an excessive amount, the resulting magnetic recording medium has a low recording density, and if the binder content is too low, a weak magnetic layer which is less durable and experiences shedding easily is formed.

In order to produce a highly durable magnetic recording medium, various curing agents may be incorporated in the magnetic layer, and a polyisocyanate is a suitable curing agent. Illustrative polyisocyanates are addition products of diisocyanate and trivalent polyols, diisocyanate pentamers, and decarboxylation products of 3 mols of diisocyanate and water. More specifically, suitable curing agents include an adduct of 3 mols of tolylene diisocyanate and 1 mol of trimethylolpropane, an adduct of 3 mols of metaxylylene diisocyanate and 1 mol of trimethylolpropane, a tolyne diisocyanate pentamer, a pentamer made of 2 mols of tolylene diisocyanate, and a decarboxylation product prepared by reacting 3 mols of hexamethylene diisocyanate and 1 mol of water. All of these compounds can easily be produced on an industrial scale.

Besides the magnetic metallic powder, the binder and curing agent described above, the magnetic layer may contain other additive such as dispersants, lubricants, abrasives and antistats.

Examples of the dispersant are aliphatic acids having 8 to 18 carbon atoms RCOOH wherein R is a saturated or unsaturated alkyl group having 7 to 17 carbon atoms) caprylic acid, capric acid, lauric acid, myristic acid, palmitic acid, stearic acid, oleic acid, elaidic acid, linoleic acid and linolenic acid. Metal soaps made of alkali metals (Li, Na, K, etc.) or alkaline earth metals (Mg, Ca, Ba, etc.) of these aliphatic acids, as well as lecithins may also be used as the dispersant. Higher alcohols having 12 or more carbon atoms, as well as sulfate esters of these alcohols are also usable. These dispersants and those listed above may be used either individually or in admixture in an amount of 1 to 20 parts by weight for 100 parts by weight of the magnetic metallic powder. Illustrative dispersants are given in Japanese Patent Publications Nos. 28369/64, 17945/69, 15001/73, U.S. Pat. Nos. 3,587,993 and 3,470,021.

Examples of the lubricant are silicone oil, carbon black, graphite, carbon black graft polymer, molybdenum disulfide, tungsten disulfide, and waxes or aliphatic acid esters of monobasic aliphatic acids having 12-16 carbon atoms and monovalent alcohols having a total of 21-23 carbon atoms as combined with the carbon atoms in said aliphatic acids. These lubricants are generally used in an amount of 0.2 to 20 parts by weight per 100 parts by weight of the magnetic metallic powder. For specific lubricants, see Publications Nos. 23889/68 and 81543/68; U.S. Pat. Nos. 3,470,021, 3,492,235, 3,497,411, 3,523,086, 3,625,720, 3,630,772, 3,634,253, 3,630,772, 3,634,253, 3,642,539, and 3,687,725; IBM Technical Disclosure Bulletin Vol. 9, No. 7, page 779, December 1966; and ELECTRONIK, No. 12, page 380, 1961.

Common abrasives may be used in the present invention, and they include fused alumina, silicon carbide, chromium oxide, corundum, artificial corundum, artificial diamond, garnet, and emery (main components: corundum and magnetite). These abrasives have an average particle size of 0.05 to 5μ, and a 0.1 to 2μ range is particularly preferred. They are used in an amount of 1 to 20 parts by weight per 100 parts by weight of the magnetic metallic powder. For more details of these abrasives, see Japanese Patent Application (OPI) No. 115510/74; U.S. Pat. Nos. 3,007,807, 3,041,196 and 3,687,725; British Pat. No. 1,145,349; and German Pat. (DT-PS) No. 853,211.

Suitable antistats are fine particles of an electrically conductive material such as graphite, carbon black, tin oxide/antimony oxide or tin oxide/tintanium oxide/antimony oxide compound, or carbon black graft polymer; a natural surfactant such as saponin; an alkylene oxide, glycerin or glycidol nonionic surfactant; a cationic surfactant such as higher alkylamines, heterocyclic compounds (e.g. pyridine), and phosphonium or sulfoniums; an anionic surfactant containing an acidic group such as carboxylic acid group, sulfonic acid group phosphoric acid group, sulfate ester group or phosphate ester group; and an amphoteric surfactant such as amino acids, aminosulfonic acids, and sulfate or phosphate esters of aminoalcohol.

For more detailed information on the surfactants that can be used as antistats, see the following patents and monographs: U.S. Pat. Nos. 2,271,623, 2,240,472, 2,288,226, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974; German Patent Application (OLS) No. 1,942,665; British Pat. Nos. 1,077,317, 1,198,450; "Synthesis of Surfactants and Their Applications" by Rhohei Oda et al., Maki Shoten, 1964; A. W. Pailey: "Surface Active Agents", Interscience Publication Incorporated, 1958; T. P. Shisley: "Encyclopaedia of Surface Active Agents", vol. 2, Chemical Publish Company, 1964; "Handbook of Surfactants", 6th printing, Sangyo Tosho K. K., Dec. 20, 1966.

These surfactants may be used either individually or in combination. They are generally used as antistats, but they may be used for other purposes such as increasing the dispersibility of magnetic particles, improving the magnetic characteristics, improving the lubricity of the magnetic particles, or as coating aids.

In order to prepare the magnetic recording medium of the present invention, the magnetic particles and binder described above are mixed and dispersed in a suitable solvent so as to form a magnetic paint, which is then applied to a support and dried. The magnetic paint may also contain suitable additives such as dispersant, lubricant, abrasive and antistat. Suitable solvents for preparing the magnetic paint or those which are used to facilitate the application of that paint include ketones such as acetone, methyl ethyl kethone (MEK), methyl isobutyl ketone (MIBK) and cyclohexanone; alcohols such as methanol, ethanol, propanol and butanol; esters such as methyl acetate, ethyl acetate, butyl acetate, ethyl lactate, and ethylene glycol monoacetate; ethers such as diethylene glycol dimethyl ether, 2-ethoxyethanol, tetrahydrofurin and dioxane; aromatic hydrocarbons such as benzene, toluene and xylene; halogenated hydrocarbons such as methylene chloride, ethylene chloride, carbon tetrachloride, chloroform, and dichlorobenzene.

The magnetic paint is prepared by charging a mixer with the magnetic particles and all other ingredients simultaneously or sequentially. For instance, the magnetic particles are added to a solution containing the dispersant, and the mixture is stirred for a predetermined period, and then, the other ingredients are added under stirring.

Various mixers may be used to achieve thorough mixing of the magnetic paint composition. Examples are a two-roll mill, three-roll mill, ball mill, pebble mill, sand grinder, sjegvari attritor, high-speed impeller disperser, high-speed stone-mill, high-speed impact mill, disper-kneader, high-speed mixer, homogenizer and ultrasonic disperser.

The magnetic paint prepared according to this method is characterized by a highly uniform dispersion of the magnetic particles, and when their dispersibility was evaluated by the method described in the Examples that are given later in this specification, much fewer agglomerates were observed under electron microscope than in the case of the conventional magnetic paint.

For details of the kneading and dispersing technique, see T. C. Patton, "Paint Flow and Pigment Dispersion", John Wiley & Sons, as well as U.S. Pat. Nos. 2,581,414 and 2,855,156.

For further details of the method of preparing magnetic paints, see Japanese Patent Publications No. 15/60, No. 26794/64, No. 186/68, No. 28043/72, No. 28045/72, No. 28046/72, No. 28047/72, No. 31445/72, No. 11162/73, No. 21332/73 and No. 33683/73.

Suitable non-magnetic supports include polyesters such as polyethylene terephthalate and polyethylene-2, 6-naphthalate; polyolefins such as polypropylene; cellulose derivatives such as cellulose triacetate and diacetate; plastics such as polycarbonate; non-magnetic metals such as aluminum, copper, and zinc; and ceramics such as glass and "new ceramics".

The non-magnetic support may be in the form of a film, tape, sheet, disc, card drum or other suitable shapes, and a suitable material is selected from among various materials depending on its form.

The thickness of these non-magnetic supports varies with their physical shape. For films and sheets, the thickness is between about 3 and 100 μm, preferably from 5 to 50 μm; for disks and cards, the thickness ranges from about 30 μm to 10 mm. The supports may be in a cylindrical drum shape whose specific configuration is determined by the type of the recorder with which the magnetic recording medium of the present invention is used.

The back surface (opposite the side having the magnetic coating) of the support may be provided with a protective coating for various purposes, e.g. prevention of static buildup and print-through.

For detailed information on the technique of forming the backcoat, see U.S. Pat. Nos. 2,804,401, 3,293,066, 3,617,378, 3,062,676, 3,734,772, 3,476,596, 2,643,084, 2,803,556, 2,887,462, 2,923,642, 2,997,451, 3,007,892, 3,041,196, 3,115,420, and 3,166,688.

A magnetic coating is formed from the magnetic paint on a support by gravure roll coating, wire bar coating, doctor blade coating, reverse roll coating, dip coating, air knife coating, calender coating, squeeze coating, kiss coating and fountain coating. For details of these and other coating techniques, see "Coating Kogaku (Coating Engineering)", published by Asakura Shoten, March 1971, p. 258 ff., and "Plastic Films—Their Processing and Applications", published by Gihodo, 1971.

The magnetic coating thus formed on the support is dried after the magnetic particles according to the present invention in the coating are optionally oriented in a magnetic field. If necessary, the web with the magnetic coat may be smoothed or slit into a shape desired for the final magnetic recording medium. For the magnetic orientation, an a.c. or d.c. magnetic field having a magnetizing force of about 500 to 3,000 Gauss is preferred. The web is subsequently dried preferably at a temperature between about 50° and 100° C. for a period of about 3 to 10 minutes. Other methods suitable for use in the present invention to orient the magnetic particles magnetically are found in various patents such as U.S. Pat. Nos. 1,949,840, 2,796,359, 3,001,891, 3,172,776, 3,416,949, 3,473,960, and 3,681,138; Japanese Patent Publications Nos. 3427/57, 28368/64, 23624/65, 23625/65, 13181/66, 13043/73 and 39722/73.

The specific method of magnetically orienting the metallic particles in the magnetic layer of the recording medium of the present invention is determined by the use of that medium.

ADVANTAGES OF THE INVENTION (1) The magnetic layer of the medium according to the present invention contains magnetic metallic powder whose differential thermal curve will not change up to a temperature of at least 80° C. Therefore, even after repeated running of the medium, the magnetic metallic powder will not be easily oxidized and there will be no deterioration of the electro-to-magnetic conversion characteristics.

(2) The differential thermal curve of the magnetic powder remains stable up to a temperature of at least 80° C. Therefore, even if heat (av. 60°–75° C.) is generated by friction with the magnetic head during recording or playback, the magnetic metallic powder remains stable enough to ensure high durability against still-frame operation.

(3) The magnetic metallic powder whose differential thermal curve will not change up to a temperature of at least 80° C. has high dispersibility and hence assures the production of a highly durable magnetic recording medium.

EXAMPLES

The advantages of the present invention will become apparent by reading the following working examples and comparative examples, in which all "parts" are by weight.

EXAMPLES 1 to 6

(1) Preparation of magnetic paints

Six samples of magnetic composition each having the formulation shown below were prepared using Fe-base metallic powders (Fe≧60 atm. wt. %) respectively having Al contents of 1.3, 3, 3.5, 4.2, 5.1 and 7.0 atm. wt. %. The first three powders had a Si content of 0.5 atm. wt. % or below, and the powder with 4.2% Al had a Si content of 1 atm. wt. % or less. The Al and Si contents of the respective powders were measured with an X-ray microanalyzer, "X-556" Model KEVEX-7000 of Hitachi, Ltd.

| Components | Amount (parts) |
|---|---|
| Fe—base magnetic metallic powder | 100 |
| VAGH (vinyl chloride-vinyl acetate copolymer of Union Carbide Corporation) | 10 |
| Estan 5701 (polyurethane resin of B. F. Goodrich Chemical Co.) | 10 |
| Lecithin | 3 |
| MEK | 70 |
| Toluene | 60 |
| Cyclohexanone | 5 |

The six metallic powders having Al contents of 1.3, 3, 3.5, 4.2, 5.1 and 7.0 atm. wt. % were characterized by such properties that their differential thermal curves would not change up to respective temperatures of 83°, 86°, 88°, 95°, 97° and 130° C.

The components shown above were thoroughly mixed and dispersed with a ball mill. To each of the dispersions, 5 parts of Collonate L (polyisocyanate solution of Nippon Polyurethane Industry Co., Ltd.) was added and intimately mixed to provide six samples of magnetic paint which were given identification numbers 1 to 6 according to the Al contents (in the increasing order) of the magnetic metallic powders.

(2) Preparation of magnetic recording mediums

The respective magnetic paint samples were applied to one side of six polyethylene terephthalate film bases (12μ thick) to give a magnetic coating in a dry thickness of 5μ while the magnetic particles were oriented in a magnetic field of 2,000 Gauss.

The resulting broad webs were supercalendered and slit into six 12.65 mm-wide video tape samples, which were identified by Nos. 1 to 6 according to magnetic paint samples Nos. 1 to 6.

EXAMPLES 7 AND 8

Two samples of magnetic metallic powder (100 parts) containing 0.8% and 1.3% of Al were each dispersed in 670 parts of a 0.2% methylene chloride/toluene (70:30) solution of Tomide #220 (prduct of Fuji Kasei K. K.) having the following formula:

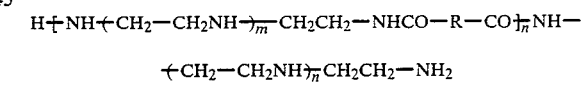

(wherein R is

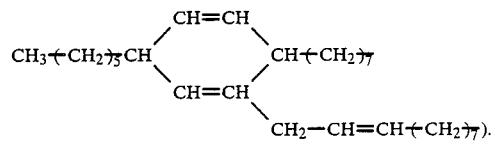

Each of the dispersions was filtered and the resulting magnetic metallic powder was re-dispersed in 300 ml of a mineral oil ("Isopar"). After adding a solution consisting of toluylene diisocyanate (2 parts) and Isopar (60 parts), the resulting mixture was heated at 50° C. for 1 hour. The magnetic metallic powders obtained by filtration were washed with n-hexane and dried in a nitrogen atmosphere, thereby providing two samples of coated magnetic metallic powder having differential thermal curves which were stable up to 120° C. and 140° C., respectively.

Using these two magnetic metallic powders, video tape samples Nos. 7 and 8 which were 12.65 mm wide were prepared by repeating the procedure of Example 1.

EXAMPLE 9

Fe-base magnetic metallic powder (Al: 2 atm. wt. %) were gradually oxidized on their surface to provide a magnetic metallic powder having a differential thermal curve that would not change up to 93° C. This powder was used to prepare a video tape sample No. 9 (12.65 mm wide) by repeating the procedure of Example 1.

EXAMPLE 10

Fe-base magnetic metallic powder (Al: 3.5 atm. wt. %) were surface-treated with silicone oil to provide a rustproof magnetic metallic powder having a differential thermal curve that would not change up to 100° C. This powder was used to prepare a video tape sample No. 10 (12.65 mm wide) by repeating the procedure of Example 1.

COMPARATIVE EXAMPLE 1

Comparative video tape sample No. 1 which was 12.65 mm wide was prepared as in Example 1 except that the magnetic metallic powder was made of only conventional Fe-base metallic particles whose differential thermal curve was stable up to 25° C.

COMPARATIVE EXAMPLE 2

Magnetic metallic powder (with a differential thermal curve that would easily change at room temperature) were given a silicone oil coat to provide a magnetic metallic powder having a differential thermal curve that would not change up to 50° C. This powder was used to prepare comparative video tape sample No. 2 (12.65 mm wide) by repeating the procedure of Example 1.

The magnetic metallic powder used in Comparative Example 1 and those used in Comparative Example 2 (before they were coated with silicone oil) were found to have the following compositions by determination with an X-ray microanalyzer, "X-556" Model KEVEX-7000 of Hitachi, Ltd.:

Magnetic metallic powder used in Comparative Example 1
Si: 1.1 atm. wt. %
Ni: 6.8 atm. wt. %
Al: undetected.

Magnetic metallic powder used in Comparative Example 2
Si: 3.0 atm. wt. %
Ni: 5.0 atm. wt. %
Al: undetected.

COMPARATIVE EXAMPLE 3

Magnetic metallic powder were gradually oxidized on their surface to provide a magnetic metallic powder having a differential thermal curve that would not change up to 73° C. This powder was used to prepare a comparative video tape sample No. 3 (12.65 mm wide) by repeating the procedure of Example 1.

The performance of video tape samples Nos. 1 to 10 and comparative samples Nos. 1 to 3 was evaluated by checking the durability to repeated still-frame opration (still life), saturation magnetization (Bm) and storage stability. The results are shown in Table 1.

TABLE 1

| Performance Tape No. | Still life (min) | Bm (Gauss) | Bm after storage (Gauss) | Percent remanence after storage |
| --- | --- | --- | --- | --- |
| Sample 1 | >60 | 3,500 | 3,250 | 93 |
| Sample 2 | >60 | 3,500 | 3,300 | 94 |
| Sample 3 | >60 | 3,400 | 3,250 | 96 |
| Sample 4 | >60 | 3,200 | 3,150 | 98 |
| Sample 5 | >60 | 3,100 | 3,050 | 98 |
| Sample 6 | >60 | 2,900 | 2,850 | 98 |
| Sample 7 | >60 | 2,950 | 2,850 | 96 |
| Sample 8 | >60 | 2,900 | 2,800 | 96 |
| Sample 9 | >60 | 3,000 | 2,900 | 96 |
| Sample 10 | >60 | 3,300 | 3,150 | 96 |
| Comparative Sample 1 | <1 | 3,600 | 2,200 | 60 |
| Comparative Sample 2 | <3 | 3,000 | 2,600 | 86 |
| Comparative Sample 3 | 15 | 3,900 | 2,500 | 86 |

Still life: The time (in minutes) until a 2 dB drop occurred in the playback output of a still image.
Bm: The saturation magnetization of a sample tape as measured in Gauss.
Bm after storage: The saturation magnetization (in Gauss) of a sample tape that was left to stand for 1 week at 50° C. and 90% r.h.
Percent remanence after storage: Bm after storage compared with Bm before storage taken as 100%.

Figure 5:
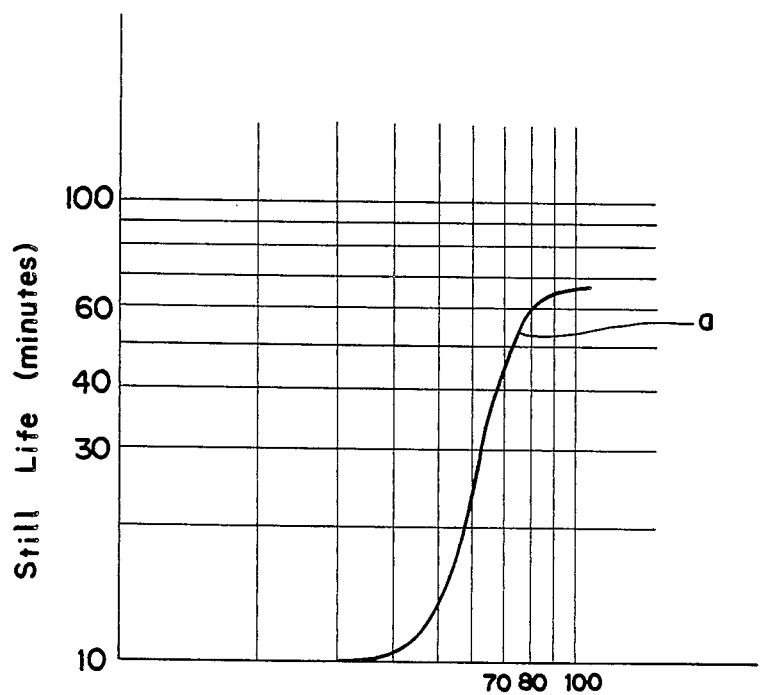
FIG. 5 is a graph showing the still life of a magnetic recording medium vs. the temperature at which a change was observed in the differential thermal curve of a magnetic metallic powder incorporated in the magnetic layer of that medium.

The still life characteristics of tape samples Nos. 1 to 10 were plotted against the stability temperatures of the differential thermal curves of the magnetic powders used in the respective samples, and the results are shown by characteristic curve a in FIG. 5, from which one can see that the tape samples using magnetic powders having differential thermal curves that remained stable up to 80° C. had an appreciably long still life.

What is claimed is:

1. A magnetic recording medium comprising a support and, provided thereon, a magnetic layer containing a binder resin and a doped magnetic metallic powder, said magnetic metallic powder comprising iron and aluminum, the content of said aluminum being from 0.5 to 20 atomic % of all metallic components of said magnetic metallic powder, and the differential thermal curve of said magnetic metallic powder being substantially unchanged up to a temperature of at least 80° C.

2. A magnetic recording medium according to claim 1, wherein said magnetic metallic powder contains aluminum atoms in an amount of from 1.0 to 20 atomic % of all metallic components of said magnetic metallic powder.

3. A magnetic recording medium according to claim 1, wherein said magnetic layer contains a binder resin selected from the group consisting of phenolic resin, epoxy resin, polyurethane curable resin, urea resin, melamine resin, alkyd resin, silicone resin, acrylic reactive resin, a mixture of high-molecular weight polyester resin and isocyanate prepolymer, a mixture of methacrylic acid salt copolymer and diisocyanate prepolymer, a mixture of polyester polyol and polyisocyanate, urea-formaldehyde resin, low-molecular weight glycol/high-molecular weight diol/triphenylmethane triisocyanate mixture, polyamine resins and mixtures thereof.

4. A magnetic recording medium according to claim 1, wherein said magnetic layer contains a binder resin selected from the group consisting of vinyl chloride/vinyl acetate copolymer, vinyl chloride/vinylidene chloride copolymer, vinyl chloride/acryl onitrile copolymer, acrylic acid ester/acrylonitrile copolymer, acrylic acid ester/vinylidene chloride copolymer, methacrylic acid ester/ethylene copolymer, urethane elastomer, polyvinyl fluoride, vinylidene chlordie/acrylonitrile copolymer, butadiene/acrylonitrile copolymer, polyamide resin, polyvinyl butyral, cellulose derivative, styrene/butadiene copolymer, polyester resin and chlorovinylether/acrylic acid ester copolymer.

5. A magnetic recording medium according to claim 1, wherein said magnetic layer contains 5 to 400 parts by weight of binder per 100 parts by weight of the magnetic metallic powder.

6. A magnetic recording medium according to claim 5, wherein said magnetic layer contains 10 to 200 parts by weight of binder per 100 parts by weight of the magnetic metallic powder.

7. A magnetic recording medium according to claim 1, wherein said magnetic layer further contains polyisocyanate.

8. A magnetic recording medium according to claim 1, wherein said magnetic layer contains a dispersant, a lubricant, an abrasive or an antistat.

9. The medium of claim 1 wherein said binder resin is thermoplastic.

10. The medium of claim 9 wherein said binder resin is a polyurethane elastomer.

11. The medium of claim 1 wherein said binder resin is thermosetting.

12. The medium of claim 11 wherein said binder resin is a polyurethane curable resin.

13. The medium of claim 1 wherein said iron is at least 80 atomic % based on all metallic components of said power.

14. The medium of claim 1 wherein said powder consists essentially of iron and aluminum.

15. The medium of claim 1 wherein said powder comprises an iron-aluminum alloy system.

16. The medium of claim 15 wherein said iron is at least 80 atomic % based on all metallic compounds of said powder.

17. The medium of claim 15 wherein said system consists essentially of iron and aluminum.

18. The medium of claim 1 wherein said binder resin is a combination of polymethane elastomer and vinyl chloride-vinyl acetate copolymer.

19. The medium of claim 1 wherein said binder resin is a combination of a polyurethane curable resin and a vinyl chloride-vinyl acetate copolymer.

20. A magnetic recording medium according to claim 15, wherein said doped magnetic metallic powder contains aluminum atoms in an amount of from 1.0 to 20 atomic % of all metallic components of said magnetic metallic powder.

21. A magnetic recording medium according to claim 15, wherein said magnetic layer contains a binder resin selected from the group consisting of phenolic resins, epoxy resins, polyurethane curable resin, urea resin, melamine resin, alkyd resin, silicone resin, acrylic reactive resin, a mixture of high-molecular weight polyester resin and isocyanate prepolymer, a mixture of methacrylic acid salt copolymer and diisocyanate prepolymer, a mixture of polyester polyol and polyisocyanate, urea-formaldehyde resin, low-molecular weight glycol/high-molecular weight diol/triphenylmethane triisocyanate mixture, polyamine resins and mixtures thereof.

22. A magnetic recording medium according to claim 15, wherein said magnetic layer contains a binder resin selected from the group consisting of vinyl chloride/vinyl acetate copolymer, vinyl chloride/vinylidene chloride copolymer, acetate copolymer, vinyl chloride/vinylidene chloride copolymer, vinyl chloride/acrylonitrile copolymer, acrylic acid ester/acrylonitrile copolymer, acrylic acid ester/vinylidene chloride copolymer, methacrylic acid ester/ethylene copolymer, urethane elastomer, polyvinyl fluoride, vinylidene chloride/acrylonitrile copolymer, butadiene/acrylonitrile copolymer, polyamide resin, polyvinyl butyral, cellulose derivative, styrene/butadiene copolymer, polyester resin and chlorovinyl-ether/acrylic acid ester copolymer.

23. A magnetic recording medium according to claim 15, wherein said magnetic layer contains 5 to 400 parts by weight of binder per 100 parts by weight of the doped magnetic metallic powder.

24. A magnetic recording medium according to claim 23, wherein said magnetic layer contains 10 to 200 parts by weight of binder per 100 parts by weight of the doped magnetic metallic powder.

25. A magnetic recording medium according to claim 15, wherein said magnetic layer further contains polyisocyanate.

26. A magnetic recording medium according to claim 15, wherein said magnetic layer contains a dispersant, a lubricant, an abrasive or an antistat.

27. The medium of claim 10 wherein said iron is at least 80 atomic percent based on all metallic components of said powder.

28. The medium of claim 10 wherein said powder consists essentially or iron and aluminum.

29. The medium of claim 10 wherein said powder comprises an iron-aluminum alloy system.

* * * * *